United States Patent [19]

Kobayashi et al.

[11] Patent Number: 4,987,299
[45] Date of Patent: Jan. 22, 1991

[54] ROTATION QUANTITY MEASURING METHOD AND SYSTEM

[75] Inventors: Hiroshi Kobayashi, No. 3-15, Hanakoganei, Kodaira-shi, Tokyo; Haruhiko Machida, No. 4-10-7, Nakaochiai, Shinjuku, Tokyo; Jun Akedo, Tokyo; Hiroyoshi Funato, Chigasaki, all of Japan

[73] Assignees: Ricoh Company, Ltd., Tokyo; Hiroshi Kobayashi, Kodaira; Haruhiko Machida, Tokyo, all of Japan

[21] Appl. No.: 397,287

[22] Filed: Aug. 23, 1989

[30] Foreign Application Priority Data

Aug. 24, 1988 [JP] Japan ................ 63-210127

[51] Int. Cl.$^5$ ........................... G01D 5/34
[52] U.S. Cl. .................. 250/231.14; 250/231.18; 250/237 G
[58] Field of Search ......... 250/237 G, 231.12, 231.13, 250/231.14, 231.15, 213.16, 213.17, 231.18; 341/13, 15; 356/373, 374

[56] References Cited

U.S. PATENT DOCUMENTS

| | | | |
|---|---|---|---|
| 3,627,069 | 12/1971 | Ray | 250/231.18 |
| 4,201,911 | 5/1980 | Dering | 250/231.17 |
| 4,634,861 | 6/1987 | Ching et al. | 250/231.18 |
| 4,733,071 | 3/1988 | Tokunaga | 250/237 G |
| 4,751,383 | 6/1988 | Ueyama | 250/237 G |
| 4,874,941 | 10/1989 | Spillman, Jr. | 250/237 G |

FOREIGN PATENT DOCUMENTS 63-47616 2/1988 Japan .

Primary Examiner—David C. Nelms
Assistant Examiner—George Beck
Attorney, Agent, or Firm—Oblon, Spivak, McClelland, Maier & Neustadt

[57] ABSTRACT

A rotation quantity measuring method and system measures a rotation quantity of an object body. The rotation quantity is measured by irradiating a light from a light source on a grating pattern which is formed on a peripheral surface of a cylindrical body which rotates integrally with the object body, and detecting a shadow picture pattern which is generated by a reflected light received from the grating pattern based on a diffraction caused by the grating pattern. Then, the rotation quantity of the object body is measured based on a movement of the shadow picture pattern as the object body rotates.

20 Claims, 2 Drawing Sheets

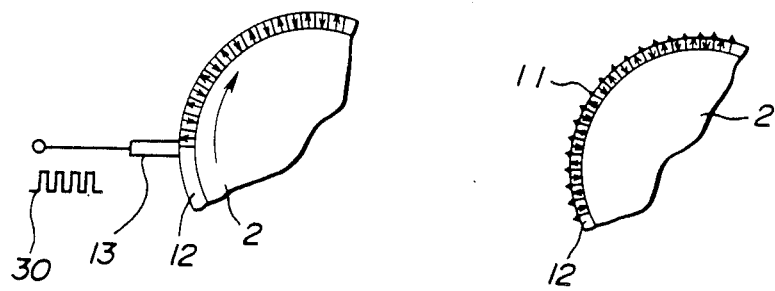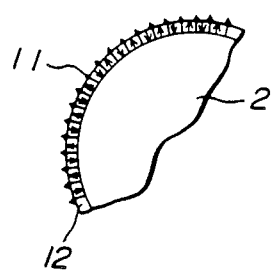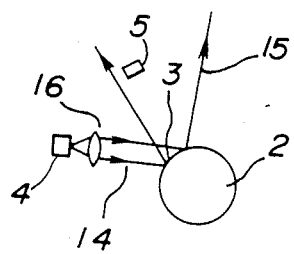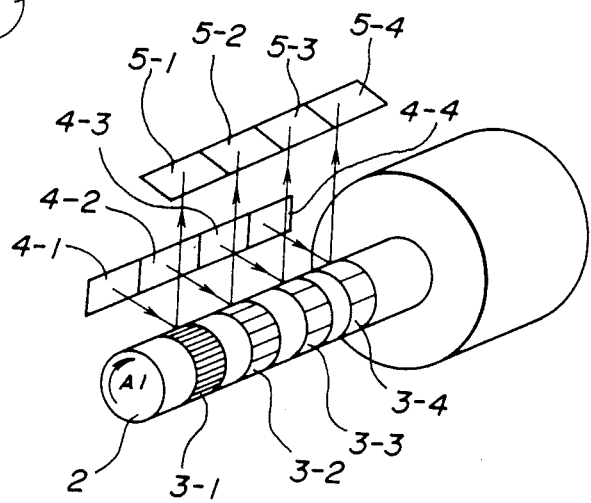

ROTATION QUANTITY MEASURING METHOD AND SYSTEM

BACKGROUND OF THE INVENTION

The present invention generally relates to rotation quantity measuring methods and systems, and more particularly to a rotation quantity measuring method and system for measuring a rotation quantity of an arbitrary rotary body which is applicable to various rotary encoders.

As a method of measuring a rotation quantity of an object body, there is a conventional method which forms a grating pattern on a peripheral portion of a disc shaped rotary body as an encoder pattern and fixes the rotary body on the object body so that the rotary body rotates integrally with the object body. According to this conventional method, the rotation quantity of the object body is measured by optically detecting a movement of the encoder pattern. For example, "The Use of Optical Parts and Consideration to be Given", Optronics Company, 1985 proposes this conventional method.

However, the above described conventional method suffers from the following problems. First, a measuring apparatus which employs the conventional method becomes bulky because the rotary body which is fixed on the object body has a disc shape. Second, the patterning of the grating pattern on the rotary body is formed by a photolithography, but it is troublesome to carry out a large number of patterning steps which are required to form the grating pattern. Third, when setting a pitch of gratings of the grating pattern to one micron or less so as to obtain a high resolution, for example, the patterning must be carried out over a large area thereby making it difficult to improve the accuracy of the measurement.

Therefore, there is a demand to realize a rotation quantity measuring method which does not require a bulky measuring apparatus and which is capable of making a highly accurate measurement.

SUMMARY OF THE INVENTION

Accordingly, it is a general object of the present invention to provide a novel and useful rotation quantity measuring method and system in which the problems described above are eliminated.

Another and more specific object of the present invention is to provide a rotation quantity measuring method for measuring a rotation quantity of an object body, comprising the steps of irradiating a light from a light source on at least one grating pattern which is formed on a peripheral surface of a cylindrical body which rotates integrally with the object body, and detecting a shadow picture pattern which is generated by a reflected light received from the grating pattern based on a diffraction caused by the grating pattern and measuring the rotation quantity of the object body based on a movement of the shadow picture pattern as the object body rotates. According to the rotation quantity measuring method of the present invention, the rotation quantity of the object body can be measured with a high accuracy because the shadow picture pattern which is detected is enlarged compared to the grating pattern.

Still another object of the present invention is to provide a rotation quantity measuring system for measuring a rotation quantity of an object body, comprising a cylindrical body which rotates integrally with the object body, at least one grating pattern formed on a peripheral surface of the cylindrical body, a light source for emitting a light and irradiating the light on the grating pattern, and a detector for detecting a shadow picture pattern which is generated by a reflected light received from the grating pattern based on a diffraction caused by the grating pattern and measuring the rotation quantity of the object body based on a movement of the shadow picture pattern as the object body rotates. According to the rotation quantity measuring system of the present invention, it is possible to prevent the system from becoming bulky because the grating pattern is formed on the cylindrical body.

Other objects and further features of the present invention will be apparent from the following detailed description when read in conjunction with the accompanying drawings.

BRIEF DESCRIPTION OF THE DRAWINGS

FIGS. 6 and 7 are diagrams for explaining another method of forming the magnetic pattern on the cylindrical body;

FIG. 8 is a side view showing the object body for explaining a second embodiment of the rotation quantity measuring method according to the present invention; and FIG. 9 is a perspective view showing the object body for explaining a third embodiment of the rotation quantity measuring method according to the present invention.

DESCRIPTION OF THE PREFERRED EMBODIMENTS

Figure 1:
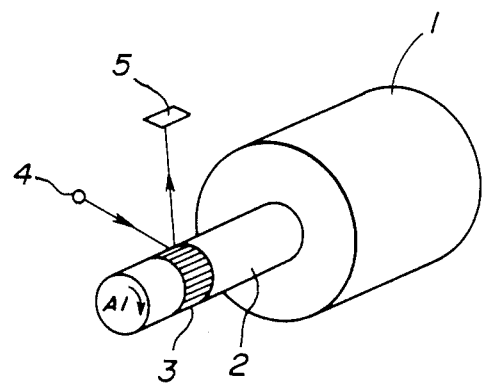
FIG. 1 is a perspective view showing an object body for explaining a first embodiment of a rotation quantity measuring method according to the present invention.

First, a description will be given of an operating principle of the rotation quantity measuring method according to the present invention. According to the present invention, light emitted from a light source is irradiated on a cylindrical body which is coaxially and integrally provided on an object body. The light which is reflected by the cylindrical body is detected by a photosensor, and the rotation quantity of the object body is measured based on the light detected by the photosensor.

A grating pattern is formed on a peripheral surface portion of the cylindrical body. This grating pattern is obtained by writing a magnetic pattern on a magnetic recording layer by use of a magnetic head and developing the magnetic pattern by a magnetic colloidal fluid. A shadow picture pattern is generated by the reflected light from the cylindrical body based on the diffraction caused by the grating pattern, and the photosensor detects the movement of the shadow picture pattern when the object body rotates.

Therefore, according to the rotation quantity measuring method of the present invention, the grating pattern is formed on the peripheral surface portion of the cylindrical body as an encoder pattern, and the cylindrical body is provided integrally with the object body. In other words, a rotary axis of the cylindrical body coincides with a rotary axis of the object body. It is of course possible to use the object body itself as the cylindrical body. For example, in a case where the object body is a rotary shaft of a motor, the rotary shaft itself may be regarded as the cylindrical body. The object body may be mechanically coupled to a rotary shaft, and in this case, the rotary shaft is regarded as the cylindrical body.

The grating pattern which is formed on the peripheral surface portion of the cylindrical body may be formed by various methods. For example, the grating pattern may be formed directly on the cylindrical body itself. As another example, a striped grating pattern may be formed in advance on a band-shaped member and the grating pattern may be formed integrally on the cylindrical body by wrapping the band-shaped member around the peripheral surface portion of the cylindrical body. Of course, a hollow cylindrical body may be used as the cylindrical body. In this case, the hollow cylindrical body is fit integrally on the rotary shaft.

The grating pattern is formed by writing a magnetic pattern on a magnetic recording layer by a magnetic head and developing the magnetic pattern using a magnetic colloidal fluid. The magnetic colloidal fluid comprises an iron oxide powder dispersed within a surface-active agent. The iron oxide powder has a sufficiently small grain size compared to the pitch of the magnetic pattern, and the grain diameter is 100 Å to 200 Å, for example.

The light emitted from the light source is irradiated on the cylindrical body and the shadow picture pattern is generated by the reflected light from the cylindrical body based on the diffraction caused by the grating pattern. Because the shadow picture pattern is generated due to the diffraction phenomenon, the light source must emit a coherent light. For example, various gas lasers, solid-state lasers, semiconductor lasers, and light emitting diodes (LEDs) which can emit a coherent light may be used as the light source.

The shadow picture pattern is a diffraction pattern which is generated based on the diffraction which is caused by the grating pattern, and corresponds to the grating pattern. The shadow picture pattern includes a shadow picture pattern which is generated by a point-source light (or point source) and a shadow picture pattern which is generated by a light source having a finite size. The point-source light refers to a case where the size of the light source is negligible compared to the pitch of the grating pattern, and the light source having the finite size refers to a case where the size of the light source is not negligible compared to the pitch of the grating pattern. As one example, the point-source light may be a known pin hole laser diode which has a stop layer provided on a light emitting end surface of a semiconductor laser and a pin hole provided in the stop layer. As another example, the point-source light may be a semiconductor laser having a short side of a light emitting part thereof arranged parallel to the direction in which the gratings of the grating pattern are oriented. On the other hand, as an example of the light source having the finite size, the light source may be a semiconductor laser which has a longer side of a light emitting part arranged parallel to the direction in which the gratings of the grating pattern are oriented.

The present invention is thus characterized by the following two features. First, the present invention is characterized by the peculiarity of the grating pattern which is formed on the peripheral surface portion of the cylindrical body. Second, the present invention is characterized by the use of the shadow picture pattern.

As described above, the grating pattern is obtained by writing a magnetic pattern on the magnetic recording layer by a magnetic head and developing the magnetic pattern using a magnetic colloidal fluid. The magnetic pattern is formed by the orientation of the domains. For this reason, when the magnetic pattern is developed by the magnetic colloidal fluid and the grain size of the iron oxide particles is sufficiently small compared to the pitch of the orientation of the magnetic pattern, the iron oxide particles are concentrated at boundary portions of the domains and form a pattern having a pitch identical to that of the magnetic pattern. This pattern of the iron oxide particles is used as the grating pattern. When the grating pattern is formed by the above described method, it is possible to form a grating pattern having an extremely fine pitch.

As described above, the shadow picture pattern is a kind of diffraction pattern. The shadow picture pattern generated by use of the point-source light is proposed in a Japanese Laid-Open Patent Application No. 63-47616. When generating the shadow picture pattern by use of the point-source light, a distance A between the light source and the grating pattern and a distance B between the grating pattern and a position where the shadow picture pattern is generated must satisfy a predetermined relationship as described in the Japanese Laid-Open Patent Application No. 63-47616. Hence, when generating the shadow picture pattern using the point-source light according to the present invention, the distance between the light source and the grating pattern and the distance between the grating pattern and the position where the shadow picture pattern is generated must also satisfy a predetermined relationship, and the photosensor must be arranged at the position where the shadow picture pattern is generated.

On the other hand, when generating the shadow picture pattern using the light source which has the finite size, the generated shadow picture pattern perfectly corresponds to the grating pattern. In other words, when the distance between the light source and the grating pattern is denoted by A and the distance between the grating pattern and the position of the shadow picture pattern is denoted by B, the shadow picture pattern is generated independently of the distances A and B and the following relationship (1) stands, where PG denotes the pitch of the grating pattern and P denotes the pitch of the shadow picture pattern.

$$P/PG = (A+B)/A \qquad (1)$$

When the shadow picture pattern is used, the grating pattern is generally enlarged and detected by the photosensor. For this reason, an accurate measurement can be made even when the pitch of the grating pattern is set to an extremely small value, and a highly accurate measurement of the rotation quantity is possible.

When the grating pattern moves, the shadow picture pattern makes a similar movement which is enlarged with respect to the movement of the grating pattern. Accordingly, when the movement of the shadow picture pattern is detected by the photosensor, it is possible to accurately detect the rotation quantity of the cylindrical body and thus the rotation quantity of the object body.

In order to form a clear shadow picture pattern by use of the light source which has the finite size, the following relationship (2) must be satisfied between the pitch PG of the grating pattern and a size d of the light source along a direction parallel to the direction in which the gratings of the grating pattern are oriented.

$$(1/10) \leqq (d/PG) \leqq \qquad (2)$$

A description will now be given of a first embodiment of the rotation quantity measuring method according to the present invention, by referring to FIGS. 1 through 3. FIG. 1 generally shows a first embodiment of the rotation quantity measuring system according to the present invention which employs the first embodiment of the rotation quantity measuring method. In this embodiment, the present invention is applied to a case where a rotation quantity of a rotary shaft 2 of a motor 1 is to be measured. In other words, the rotary shaft 2 is the object body. Since the rotary shaft 2 itself has a cylindrical shape, the rotary shaft 2 itself is used as a cylindrical body and a grating pattern 3 is formed directly on a peripheral surface portion of the rotary shaft 2. Gratings of the grating pattern 3 are oriented in a rotational direction A1 of the rotary shaft 2.

In FIG. 1, a semiconductor laser 4 is used as a light source, and a laser beam emitted from the semiconductor laser 4 is irradiated on the grating pattern 3. The laser beam is reflected by the grating pattern 3 and is received by a photosensor 5. In this embodiment, the semiconductor laser 4 is arranged in such a manner than a longer side of a light emitting part of the semiconductor laser 4 is parallel to a direction in which the gratings of the grating pattern 3 are oriented. In addition, the semiconductor laser 4 has a finite size with respect to the pitch of the grating pattern 3. Accordingly, the relationship (2) described above stands between the grating pattern 3 and the semiconductor laser 4.

Figure 2:
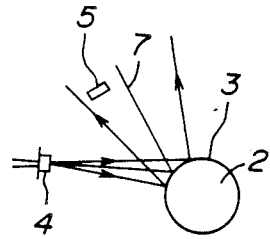
FIG. 2 is a side view of the object body shown in FIG. 1.

FIG. 2 shows the rotary shaft 2 shown in FIG. 1 viewed from the side. A diverging light emitted from the semiconductor laser 4 irradiates the portion of the rotary shaft 2 formed with the grating pattern 3. The grating pattern 3 comprises amplitude gratings and the reflectivity alternately repeats high and low values. A bundle of rays obtained by the reflection at the grating pattern 3 of the rotary shaft 2 travels with an increased divergency due to the concavo-convex reflection surface. The photosensor 5 is arranged in a region which intercepts the reflected light received from grating pattern 3 of the rotary shaft 2. In this embodiment, the photosensor 5 is arranged at a position avoiding an optical axis 7 of the reflected light which is received from grating pattern 3 of the rotary shaft 2. The optical axis 7 corresponds to an optical path of a reflected light which originates from a light which coincides with an optical axis of the semiconductor laser 4.

Figure 3:
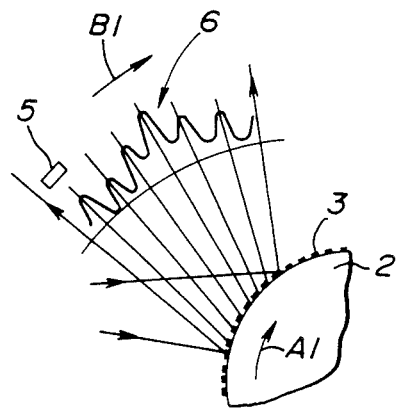
FIG. 3 is a diagram for explaining the formation of a shadow picture pattern.

FIG. 3 shows a shadow picture pattern 6 which is generated by the grating pattern 3. A light intensity distribution of the shadow picture pattern 6 corresponds to the grating pattern 3. The shadow picture pattern 6 is enlarged compared to the grating pattern 3 as may be understood from the relationship (1) described above, but the shadow picture pattern 6 in this embodiment is further enlarged compared to the grating pattern 3 owing to the concavo-convex reflection surface of the grating pattern 3.

In the light intensity distribution of the shadow picture pattern 6, the light intensity repeats an increase and decrease in correspondence with the pitch of the grating pattern 3. In a vicinity of the optical axis 7, the light intensity of the shadow picture pattern 6 is considerably large even at a portion where the light intensity is weak. On the other hand, in a region distant from the optical axis 7, the light intensity of the shadow picture pattern 6 is approximately zero at a portion where the light intensity is weak. Accordingly, the contrast of the shadow picture pattern 6 is higher in the region which is distant from the optical axis 7. In this embodiment, the photosensor 5 is arranged at a position where the contrast of the shadow picture pattern 6 is high so that the movement of the shadow picture pattern 6 can be detected with ease. Of course, it is also possible to detect the movement of the shadow picture pattern 6 when the photosensor 5 is arranged at a position on the optical axis 7 or in a vicinity of the optical axis 7, and it is not essential that the photosensor 5 is located at a position which is distant from the optical axis 7.

When the rotary shaft 2 rotates in the direction A1 in FIG. 3, the shadow picture pattern 6 makes a corresponding movement in a direction B1. This movement of the shadow picture pattern 6 is detected by the photosensor 5 so as to obtain an encoder signal which is dependent on a rotary angle of the rotary shaft 2.

Next, a description will be given of methods of forming the grating pattern 3 on the rotary shaft 2.

Figures 4, 5:
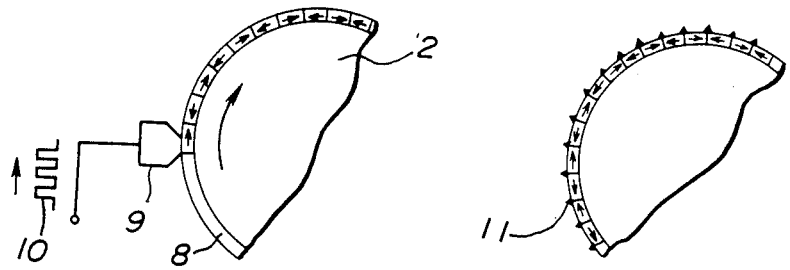
FIGS. 4 and 5 are diagrams for explaining one method of forming a magnetic pattern on a cylindrical body.

In FIG. 4, a magnetic recording layer 8 is formed on the peripheral surface of the rotary shaft 2 which is made of a metal such as aluminum (Al), iron (Fe) and nickel (Ni). The magnetic recording layer 8 is made of a magnetic material such as ferric oxide ($Fe_2O_3$). The magnetic recording layer 8 is formed to a thickness in the order of several thousand Å A by a vapor deposition, a sputtering, an electrodeposition or the like.

A magnetic head 9 makes contact with the magnetic recording layer 8, and a signal 10 having a constant frequency is applied to the magnetic head 9 while rotating the rotary shaft 2 at a constant speed with a high accuracy. As a result, a magnetic pattern is formed by the orientation of the domains in which the in-plane magnetic direction is alternately reversed as shown. After the magnetic pattern is formed on the entire peripheral surface of a desired portion of the rotary shaft 2, the rotary shaft 2 is submerged into a magnetic colloidal fluid. The magnetic colloidal fluid comprises iron oxide particles 11 having a grain diameter in the order of 100 Å to 200 Å. As shown in FIG. 5, the iron oxide particles 11 concentrate at the boundary portions of the domains in the magnetic pattern and form a pattern with a pitch identical to the that of the magnetic pattern. In other words, the magnetic pattern is developed by the magnetic colloidal fluid.

Accordingly, the desired grating pattern 3 can be formed by fixing the magnetic pattern on the peripheral surface of the rotary shaft 2 using an appropriate method. For example, it is possible to fix the magnetic pattern on the rotary shaft 2 by forming a resin layer (not shown) on the magnetic pattern. In this case, the resin layer also functions as a protection layer for protecting the grating pattern 3.

In FIG. 6, a perpendicular magnetic recording layer 12 is formed on the peripheral surface of the rotary shaft 2. The perpendicular magnetic recording layer 12 is made of cobalt (Co), barium (Ba), ferrite, Tb-Fe alloy and the like.

A perpendicular magnetic head 13 makes contact with the perpendicular magnetic recording layer 12, and a signal 30 having a constant frequency is applied to the perpendicular magnetic head 13 while rotating the rotary shaft 2 at a constant speed with a high accuracy. As a result, a magnetic pattern is formed by the orientation of the domains in which the magnetic direction along a direction perpendicular to the surface of the perpendicular magnetic recording layer 12 is alternately reversed as shown. After the magnetic pattern is formed on the entire peripheral surface of a desired portion of the rotary shaft 2, the rotary shaft 2 is submerged into a magnetic colloidal fluid which is similar to that described above. As shown in FIG. 7, the iron oxide particles 11 concentrate at the boundary portions of the domains in the magnetic pattern and form a pattern with a pitch identical to the that of the magnetic pattern. In other words, the magnetic pattern is developed by the magnetic colloidal fluid.

The desired grating pattern 3 can be formed by fixing the magnetic pattern on the peripheral surface of the rotary shaft 2 using an appropriate method. According to this latter method, the grating pattern 3 can be formed with a high resolution compared to the method which employs the in-plane magnetic recording because this latter method employs the perpendicular magnetic recording. For example, the pitch of the gratings of the grating pattern 3 may be made to 0.1 micron according to this latter method.

It is possible to provide a soft magnetic layer between the perpendicular magnetic recording layer 12 and the rotary shaft 2. The soft magnetic layer may be made of permalloy, Ni-Zn alloy, ferrite or the like. By providing such a soft magnetic layer, the writing of the magnetic pattern by the magnetic head 13 is facilitated and the magnetic pattern can be formed with a high density.

Next, a description will be given of a second embodiment of the rotation quantity measuring method according to the present invention, by referring to FIG. 8. FIG. 8 generally shows a second embodiment of the rotation quantity measuring system according to the present invention which employs the second embodiment of the rotation quantity measuring method. In FIG. 8, those parts which are essentially the same as those corresponding parts in FIGS. 1 through 3 are designated by the same reference numerals, and a description thereof will be omitted.

In this embodiment, the laser beam emitted from the semiconductor laser 4 is formed into parallel rays by a collimator lens 16 so that the parallel rays are irradiated on the grating pattern 3 of the rotary shaft 2. The photosensor 5 is arranged at a position to receive a reflected light 15 received from the grating pattern 3 of the rotary shaft 2 and to output the encoder signal. Although the illuminating rays are parallel rays, the reflected light 15 diverges due to the concavo-convex reflection surface of the grating pattern. For this reason, the light intensity distribution of the reflected light 15 forms the shadow picture pattern. Accordingly, the rotation quantity of the rotary shaft 2 can be measured similarly to that shown with respect to the first embodiment.

Next, a description will be given of a third embodiment of the rotation quantity measuring method according to the present invention, by referring to FIG. 9. FIG. 9 generally shows a third embodiment of the rotation quantity measuring system according to the present invention which is applied with the third embodiment of the rotation quantity measuring method. In FIG. 9, those parts which are essentially the same as those corresponding parts in FIGS. 1 through 3 are designated by the same reference numerals, and a description thereof will be omitted.

In the embodiments described heretofore, the present invention is applied to an incremental encoder. In this third embodiment, however, the present invention is applied to an absolute encoder.

A plurality of coded grating patterns 3-1, 3-2, 3-3 and 3-4 are formed on the peripheral surface portion of the rotary shaft 2 so as to detect an absolute rotary position of the rotary shaft 2. A plurality of light sources 4-1, 4-2, 4-3 and 4-4 are provided in correspondence with the coded grating patterns 3-1, 3-2, 3-3 and 3-4. For example, semiconductor lasers are used for the light sources 4-1, 4-2, 4-3 and 4-4. Light beams emitted from the light sources 4-1, 4-2, 4-3 and 4-4 irradiate the corresponding coded grating patterns 3-1, 3-2, 3-3 and 3-4. Movements of shadow picture patterns which are formed by reflected lights received from the coded grating patterns 3-1, 3-2, 3-3 and 3-4 are detected by corresponding photosensors 5-1, 5-2, 5-3 and 5-4. According to this embodiment, it is possible to realize an absolute encoder which can detect the absolute rotary position of the object body by a compact measuring apparatus.

Although the object body is the rotary shaft 2 in the described embodiments, the object body is not limited to such and may be any rotary body which rotates.

Further, the present invention is not limited to these embodiments, but various variations and modifications may be made without departing from the scope of the present invention.

What is claimed is:

1. A rotation quantity measuring method for measuring a rotation quantity of an object body, said rotation quantity measuring method comprising the steps of:
   irradiating a light from a light source on at least one grating pattern which is formed on an outer peripheral surface of a cylindrical body which rotates together with the object body, said grating pattern being made up of gratings which are formed with a constant pitch and which are oriented in a direction which coincides with a rotational direction of said cylindrical body; and
   detecting a shadow-like diffraction pattern which is generated by a reflected light received from the grating pattern based on a diffraction caused by the grating pattern and measuring the rotation quantity of the object body based on a positional shift of the shadow-like diffraction pattern as the object body rotates.

2. The rotation quantity measuring method as claimed in claim 1 wherein said cylindrical body is connected coaxially to said object body.

3. The rotation quantity measuring method as claimed in claim 1 wherein said cylindrical body is a portion of said object body itself.

4. The rotation quantity measuring method as claimed in claim 1 wherein said step of irradiating irradiates a coherent light from the light source directly on said grating pattern.

5. The rotation quantity measuring method as claimed in claim 1 wherein said step of irradiating irradiates on said grating pattern parallel rays which are formed from a light emitted from the light source.

6. The rotation quantity measuring method as claimed in claim 1 wherein said cylindrical body has a plurality of coded grating patterns formed thereon, and said step of irradiating irradiates a plurality of lights emitted from a plurality of light sources on corresponding coded grating patterns.

7. The rotation quantity measuring method as claimed in claim 1 wherein said step of detecting detects the reflected light at a position excluding a position where an optical axis of the reflected light passes.

8. The rotation quantity measuring method as claimed in claim 1 which further comprises the steps of providing a magnetic recording layer on the outer peripheral surface of said cylindrical body, writing a magnetic pattern on said magnetic recording layer, and developing the magnetic pattern by a magnetic colloidal fluid so as to form said grating pattern.

9. The rotation quantity measuring method as claimed in claim 1 wherein said light source has a finite size which is not negligible compared to said constant pitch of the grating pattern.

10. The rotation quantity measuring method as claimed in claim 1 wherein said constant pitch of said grating pattern and a size d of said light source along a direction parallel to a direction in which the gratings of said grating pattern are oriented to satisfy a relation $(1/10) \leq (d/FG) \leq 2$, where PG denotes said constant pitch.

11. A rotation quantity measuring system for measuring a rotation quantity of an object body, said rotation quantity measuring system comprising:
a cylindrical body which rotates together with the object body;
at least one grating pattern formed on an outer peripheral surface of said cylindrical body, said grating pattern including gratings which are formed with a constant pitch and which are oriented in a direction which coincides with a rotational direction of said cylindrical body;
light source means for emitting light and irradiating the light on said grating pattern; and
detecting means for detecting a shadow-like diffraction pattern which is generated by a reflected light received from said grating pattern based on a diffraction caused by said grating pattern and measuring the rotation quantity of the object body based on a positional shift of the shadow-like diffraction pattern as the object body rotates.

12. The rotation quantity measuring system as claimed in claim 11 wherein said cylindrical body is connected coaxially to the object body.

13. The rotation quantity measuring system as claimed in claim 11 wherein said cylindrical body is a portion of the object body itself.

14. The rotation quantity measuring system as claimed in claim 11 wherein said light source means irradiates a coherent light directly on said grating pattern.

15. The rotation quantity measuring system as claimed in claim 11 which further comprises means for irradiating on said grating pattern parallel rays which are formed from the light emitted from said light source means.

16. The rotation quantity measuring system as claimed in claim 11 wherein said cylindrical body has a plurality of coded grating patterns formed thereon, and said light source means irradiates a plurality of lights on corresponding coded grating patterns.

17. The rotation quantity measuring system as claimed in claim 11 wherein said detecting means detects the reflected light at a position excluding a position where an optical axis of the reflected light passes.

18. The rotation quantity measuring system as claimed in claim 11 wherein said grating pattern includes a magnetic recording layer which is formed on the outer peripheral surface of said cylindrical body and a magnetic pattern which is written on said magnetic recording layer and developed by a magnetic colloidal fluid.

19. The rotation quantity measuring system as claimed in claim 11 wherein said light source has a finite size which is not negligible compared to said constant pitch of the grating pattern.

20. The rotation quantity measuring system as claimed in claim 11 wherein said constant pitch of said grating pattern and a size d of said light source along a direction parallel to a direction in which the gratings of said grating pattern are oriented satisfy a relation $(1/10) \leq (d/PG) \leq 2$, where PG denotes said constant pitch.

* * * * *